USO09829027B1

(12) United States Patent
Stratton et al.

(10) Patent No.: US 9,829,027 B1
(45) Date of Patent: Nov. 28, 2017

(54) COLLATED STAPLE STRIP ASSEMBLY

(71) Applicant: Anthony C. Binek, Snohomish, WA (US)

(72) Inventors: Lawrence D. Stratton, Redmond, WA (US); Christopher M. Follett, Lake Stevens, WA (US); Anthony C. Binek, Snohomish, WA (US)

(73) Assignee: Anthony C. Binek, Snohomish, WA (US)

( * ) Notice: Subject to any disclaimer, the term of this patent is extended or adjusted under 35 U.S.C. 154(b) by 0 days.

(21) Appl. No.: 15/241,387

(22) Filed: Aug. 19, 2016

Related U.S. Application Data

(60) Continuation of application No. 14/536,542, filed on Nov. 7, 2014, now Pat. No. 9,422,962, which is a division of application No. 13/167,628, filed on Jun. 23, 2011, now abandoned.

(51) Int. Cl.
F16B 15/08 (2006.01)
(52) U.S. Cl.
CPC ..................... F16B 15/08 (2013.01)
(58) Field of Classification Search
CPC .............................. F16L 3/04; H01R 13/5837
USPC ......................................................... 206/340
See application file for complete search history.

(56) References Cited

U.S. PATENT DOCUMENTS

| 212,353 | A | 2/1879 | Card |
| 3,894,174 | A | 7/1975 | Cartun |
| 3,944,067 | A | 3/1976 | Bakoledis |
| 4,378,065 | A | 3/1983 | Smirne |
| 4,733,460 | A | 3/1988 | Auger et al. |
| 4,815,910 | A | 3/1989 | Potucek |
| 4,877,135 | A | 10/1989 | Gabriel et al. |
| 4,913,611 | A | 4/1990 | Leistner |
| 5,735,444 | A | 4/1998 | Wingert |
| 6,530,803 | B1 | 3/2003 | Chen |
| 7,225,962 | B2 | 6/2007 | Porth et al. |
| 7,654,389 | B2 * | 2/2010 | Vogrig .................... B25C 3/008 206/338 |
| 7,766,206 | B2 | 8/2010 | Kurth et al. |
| 7,874,778 | B1 | 1/2011 | Derrig et al. |
| 7,963,393 | B2 | 6/2011 | Nakagawa et al. |
| 8,047,366 | B2 * | 11/2011 | Nakagawa .............. F16B 15/08 206/343 |
| 2008/0265000 | A1 | 10/2008 | Jonsson et al. |
| 2009/0145946 | A1 | 6/2009 | Ebihara |

* cited by examiner

Primary Examiner — Chun Cheung
(74) Attorney, Agent, or Firm — Christensen O'Connor Johnson Kindness PLLC

(57) ABSTRACT

A collated staple strip assembly includes first and second staples, each staple having a bight extending between first and second legs, first and second leg axes, and a bight axis. An attachment strip is secured to at least one of the first and second legs of the first staple and at least one of the first and second legs of the second staple. The attachment strip is deformable about a first axis extending along at least a portion of the height of one of the first and second staples and substantially parallel to the leg axes of one of the first and second staples to position the first and second staples such that the bight axis of the first staple is substantially alignable with the bight axis of the second staple.

3 Claims, 7 Drawing Sheets

COLLATED STAPLE STRIP ASSEMBLY

CROSS-REFERENCE TO RELATED APPLICATION

This application is a continuation of U.S. application Ser. No. 14/536,542, filed Nov. 7, 2014, which is a division of U.S. application Ser. No. 13/167,628, filed Jun. 23, 2011, the disclosures of which are hereby expressly incorporated by reference herein it their entirety.

BACKGROUND

FIG. 1 depicts a prior art strip of staples 3 that is formed from a plurality of individual staples 5, wherein each staple optionally includes a molded body 9 formed on the free end portions of the legs 7. The legs 7 are each parallel, spaced apart, and joined together by a staple bight 6 extending between the upper ends of the legs 7. The molded body 9, which is generally rectangular in configuration, is formed of an insulating material, such as a thermoplastic resin, or the like, which is non-conductive to electricity. The molded bodies 9 are suitably molded to allow the individual staples 5 to be set into a workpiece while the strip 3 of the remaining staples remains configured as an integral whole. In this regard, the strip of insulated staples 3 may be easily installed and used in a suitable stapler or staple gun in a conventional manner.

U.S. Pat. No. 5,735,444, to Wingert, which is expressly incorporated by reference herein, teaches a representative example of a stapler suitable to receive and drive insulated staples into a workpiece, such as the staples described above with reference to FIG. 1. The staples are loaded within the stapler in sticks aligned with the longitudinal or principal axis of the stapler such that the staples are driven into a workpiece with the staple bight axis substantially perpendicular to the principal axis of the stapler. Thus, if an electrician is securing a shielded cable to a workpiece (such as, for instance, a Romex™ shielded cable), the electrician must position the stapler with the longitudinal axis of the stapler substantially aligned with or parallel to the cable axis. In this manner, the staple will be secured within the workpiece with the legs positioned on opposite sides of the cable and the staple bight extending across the width of the cable, thereby securing the cable to the workpiece. When using a stapler similar to that described in Wingert, it is often difficult and cumbersome to properly position the stapler against the cable while holding the cable against the workpiece. This is especially true when working in small or confined spaces, such as narrow stud bays of a building, which are often encountered by an electrician and wiring installer.

One device that is suitable for driving staples into a workpiece at an angle relative to the principal axis of the staple is shown and described in U.S. Patent Application Publication No. 2008/0210735, to Stratton, the disclosure of which is hereby expressly incorporated by reference herein. Stratton teaches a stapler capable of driving staples into a workpiece at an angle of about thirty to sixty degrees (30-60°) relative to the principal axis of the stapler. To feed the staples into the staple ejection mechanism of the stapler, the staples are stacked back to back at an angle relative to the principal axis of the stapler and pushed forward within the stapler by a loading rod and a push guide (see FIG. 3 of Stratton).

In certain situations, it would be desirable to position the staples at a substantially zero degree (0°) angle relative to the principal axis of the stapler (or with the bight in substantial alignment with the principal axis of the stapler). However, the staples could not be pushed into the staple ejection mechanism in a stacked, back to back manner. Rather, the staples would need to be fed individually into the staple feed mechanism so that they may be positioned at a substantially zero degree (0°) angle relative to the principal axis of the stapler.

Thus, there exists a need for an improved staple assembly that could be fed into a staple ejection mechanism of a stapler or similar device such that the staple may be driven into a workpiece with the bight substantially aligned with or at a substantially zero degree (0°) angle relative to the principal axis of the stapler.

SUMMARY

A collated staple strip assembly includes first and second staples, each staple having a bight extending between first and second legs, first and second leg axes, and a bight axis. An attachment strip is secured to at least one of the first and second legs of the first staple and at least one of the first and second legs of the second staple. The attachment strip is deformable about a first axis extending along at least a portion of the height of one of the first and second staples and substantially parallel to the leg axes of one of the first and second staples to position the first and second staples such that the bight axis of the first staple is substantially alignable with the bight axis of the second staple. In this manner, each of the first and second staples may be moved into an ejection position beneath the drive head and driven into a workpiece with the bight axis positioned in substantial alignment with the principal axis of the stapler. In one embodiment, the attachment strip is defined by one or more pieces of tape.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
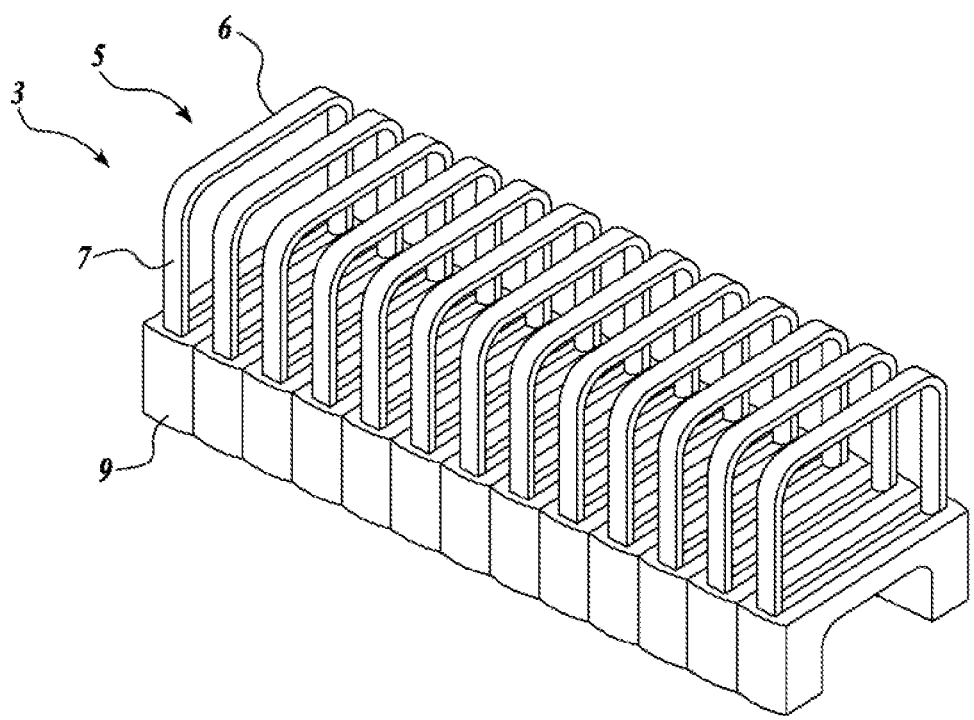
FIG. 1 is an isometric view of a prior art strip of a plurality of staples.
Figure 2:
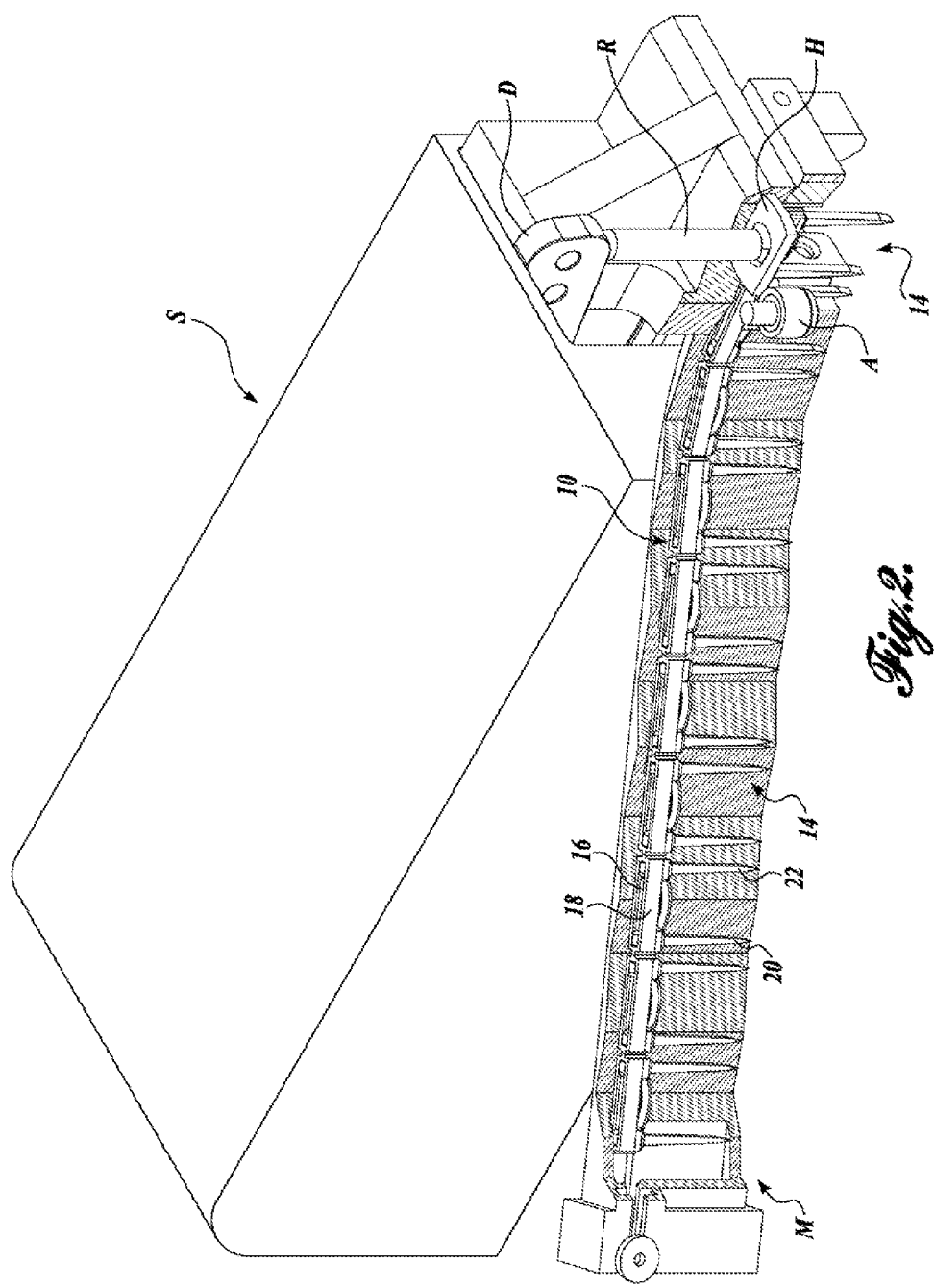
FIG. 2 is an isometric view of a collated stapler strip assembly formed in accordance with an exemplary embodiment of the present disclosure, wherein the collated stapler strip is shown in use with a stapler.
Figure 3:
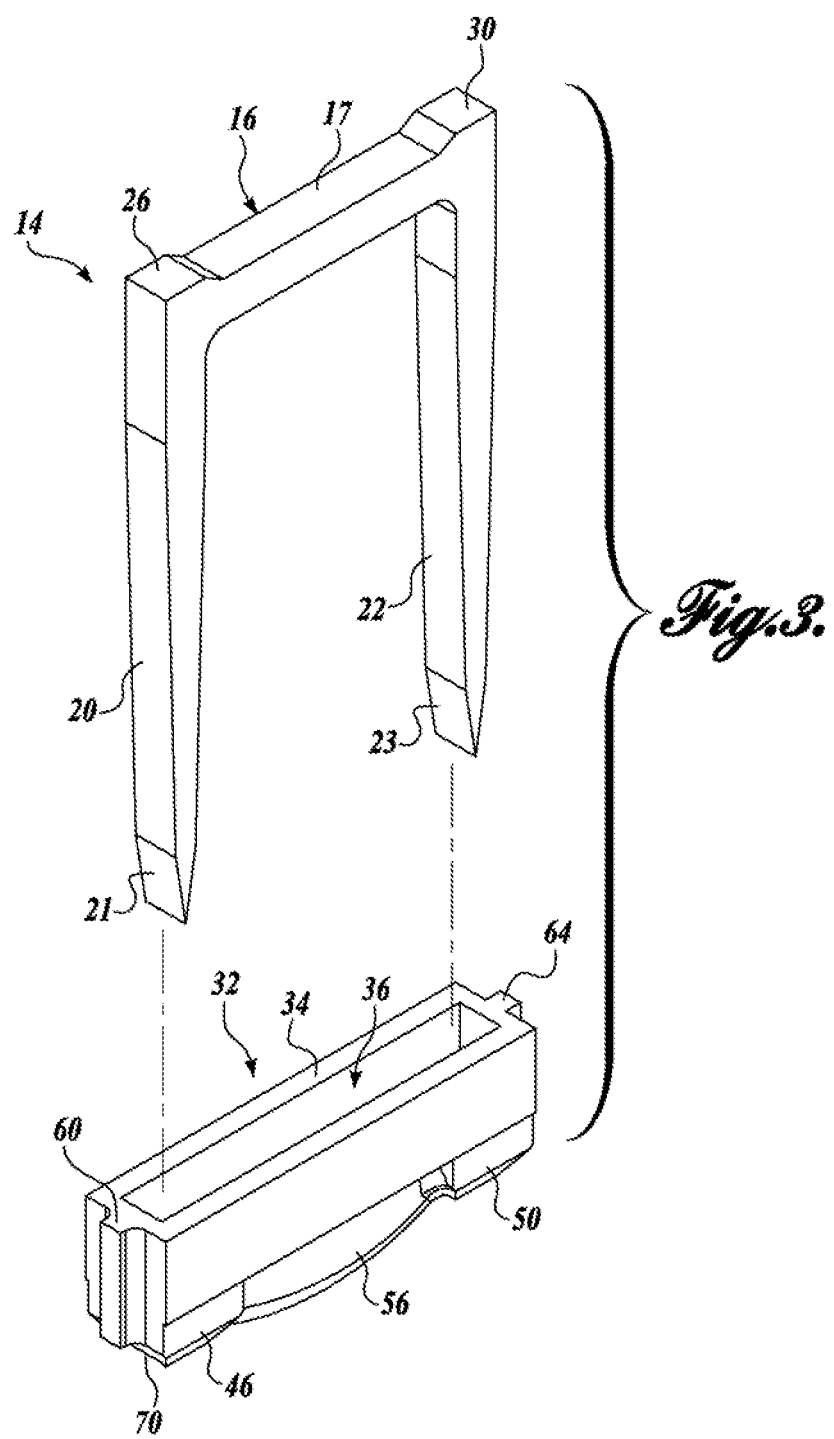
FIG. 3 is an isometric view of a portion of the collated stapler strip assembly of FIG. 2.
Figure 4:
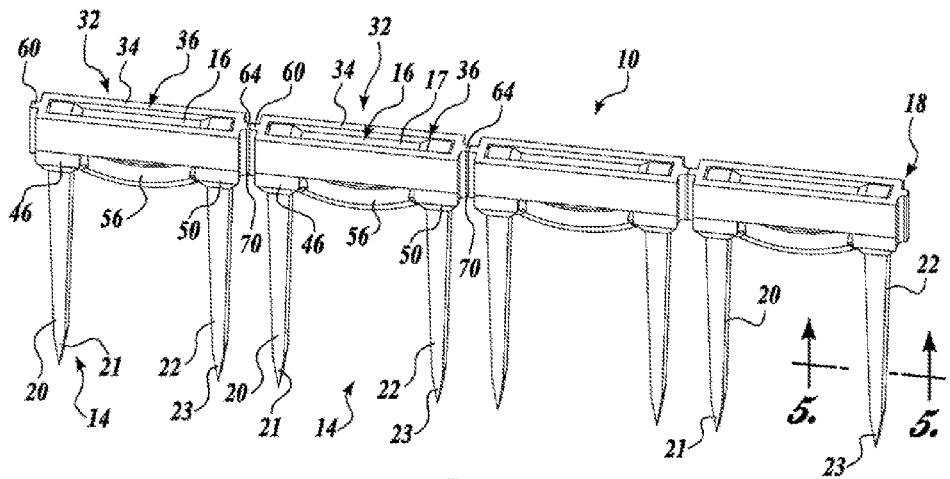
FIG. 4 is an isometric view of a larger portion of the collated stapler strip assembly of FIG. 3.

A collated staple strip assembly 10 formed in accordance with an exemplary embodiment of the present disclosure may best be seen by referring to FIG. 2. The collated staple strip assembly 10 is comprised of a plurality of staples 14 detachably secured to one another shoulder to shoulder with an attachment strip 18. Each staple 14 includes a bight 16 (see also FIGS. 2-4) extending between first and second substantially parallel legs 20 and 22.

The collated staple strip assembly 10 is configured for use with a stapler S suitable for driving each individual staple 14 of the strip in series into a workpiece (not shown) with the bight 16 of the staple 14 positioned substantially parallel to or in alignment with the longitudinal or principal axis of the stapler S. Although any suitable stapler S may be used, an exemplary embodiment of a stapler S will hereinafter be described with reference to FIG. 2.

The stapler S has a staple ejecting mechanism comprised generally of a drive arm D extending from a drive or actuation assembly (not shown), a drive rod R extending substantially transversely from the drive arm D, and an anvil or a drive head H coupled to the end of the drive rod R for engaging a top portion of a single staple 14. The stapler S may include any suitable drive or actuation assembly for moving the drive arm D (and therefore the drive rod R and drive head H) downwardly into engagement with a staple 14 positioned beneath the drive head H in an ejection position. For instance, the actuation assembly may comprise a pneumatic assembly powered by a compressed air source, a hydraulic assembly powered by pressurized hydraulic fluid, a solenoid unit powered by an electrical source, a manual mechanical assembly, etc.

The drive head H is configured for engaging and driving an individual staple 14 into a workpiece when the bight 16 of the staple 14 is positioned below the drive head H in a substantially parallel or aligned position relative to the principal axis of the stapler S. In the depicted embodiment, the drive head H is a substantially planar plate secured to the end of the drive rod R in a substantially transverse manner. The bottom surface of the drive head H engages the bight 16 of the staple 14 to drive the staple 14 into a workpiece.

The stapler S further includes a staple feeding assembly F configured to move or advance the collated staple strip assembly 10 toward the drive head H into an ejection position. In the depicted embodiment, the staple feeding assembly F is configured as a spring that is positioned to engage a portion of the collated staple strip assembly 10 to pull or move the assembly toward the drive head H. For instance, the spring may frictionally engage a portion of the attachment strip 18 to move the collated staple strip assembly 10 toward the drive head H. It should be appreciated that the staple feeding assembly F may instead be configured as a gear, a cogwheel, etc., having teeth that are engageable with grooves formed on the exterior surface of the attachment strip 18 or with a portion of the staple 14, such as one or both of the staple legs 20 or 22. Any other staple feeding assembly F suitable for advancing the collated staple strip assembly 10 toward the drive head H to position a staple 14 in an ejection position may instead be used. In that regard, the exterior surface of the attachment strip 18 may include any surface configuration suitable for engaging and/or mating with a portion of the staple feeding assembly F for moving the collated staple strip assembly 10 toward the drive head H.

The stapler S further includes a magazine M that is configured to house and guide the collated staple strip assembly 10 toward the drive head H when being moved by the staple feeding assembly F. The magazine M depicted in FIG. 2 (shown broken away) includes a housing that defines an elongated internal channel extending from the drive head H. More specifically, the elongated internal channel extends from the ejection position beneath the drive head H toward, for instance, the rear of the stapler S.

The internal channel may be in communication with a storage portion (not shown) of the magazine M defined at the rear of the stapler S. For example, the storage portion may be sized and shaped to house a coiled portion of the collated stapler strip assembly 10. The coiled assembly can be unwound and pulled through the internal channel of the magazine M to position individual staples 14 beneath the drive head H For driving the staples 14 into a work piece in series.

Referring to FIGS. 3-6, an exemplary embodiment of the collated staple strip assembly 10 will now be described in detail. Although the collated staple strip assembly 10 will be hereinafter described for use with a stapler, such as the stapler S described above, it should be appreciated that the collated staple strip assembly 10 may be used with any suitable stapler or fastening device, both powered or manual. For instance, the collated staple strip assembly 10 may instead be used with one or more of the staplers shown and described in U.S. Patent Application Publication No. 2009/026,1141, to Stratton et al., which is hereby incorporated by reference herein. Moreover, from time to time throughout the description, directional terms, such as upper/lower, interior/exterior, vertical/horizontal, upward/downward, etc., may be used for describing aspects of the stapler S or the collated stapler strip assembly 10. It should be appreciated that such terms are for illustrative purposes only, and are not intended to limit the scope of the claimed subject matter.

As briefly described above, the collated staple strip assembly 10 is comprised of a plurality of staples 14 secured to one another with an attachment strip 18. Each staple 14 is made from a suitable material, such as metal, and includes a bight 16 extending between first and second substantially parallel legs 20 and 22.

As can be appreciated from the description set forth above, the drive head H of the stapler S drives a staple 14 into a workpiece by imposing a driving force on the bight 16 of the staple 14. In that regard, the bight 16 may define a bight axis that is substantially perpendicular to the first and second legs 20 and 22 to transfer the driving force into the legs 20 and 22 and drive the legs 20 and 22 into a workpiece. The bight 16 may also be generally square or rectangular in cross-section to define a substantially flat bight upper surface 17 that is engageable by the drive head H of the stapler S to drive the staple 14 into a workpiece.

The bight 16 may include one or more protrusions, flattened portions, etc., formed on the bight upper surface 17 that are suitable for receiving and distributing the driving force of the drive head H into the legs 20 and 22. In the depicted embodiment, first and second flattened protrusions 26 and 30 extend from the bight upper surface 17. The first and second protrusions 26 and 30 are defined at each end of the bight 16 at the intersection of the bight 16 and the first and second legs 20 and 22. In that regard, the first and second protrusions 26 and 30 are symmetrically positioned on the bight 16 to help evenly distribute the driving force of the drive head H across the bight 16 to drive the legs 20 and 22 of the staple 14 into a workpiece in an even, consistent manner.

As can be appreciated from the foregoing, the first and second legs 20 and 22 are configured to be driven into a workpiece made from a suitable material, such as wood, when a driving force is imposed on the bight 16. In the depicted embodiment, each of the first and second legs 20 and 22 extends from first and second ends of the bight 16, respectively, and terminate in first and second feet 21 and 23.

The legs 20 and 22 are substantially identical in shape and configuration; and therefore, only the second leg 22 will be described in detail. The second leg 22 is generally polygonal in cross-sectional shape, such as square or rectangular, and decreases in size and/or changes in shape as the second leg 22 extends from the bight 16 toward the second foot 23.

Figure 5:
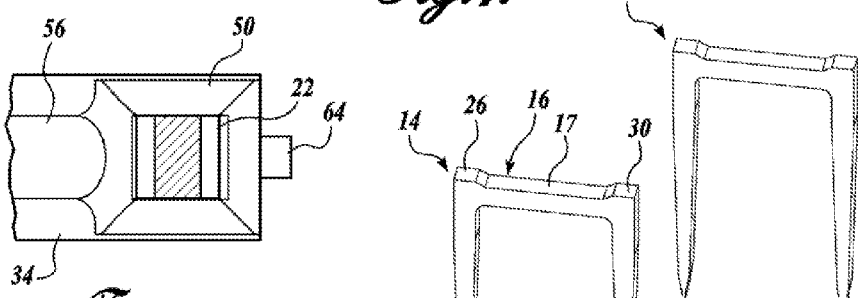
FIG. 5 is a bottom cross-sectional view of a portion of the collated stapler strip assembly of FIG. 4, taken substantially across line 5-5.
Figure 6:
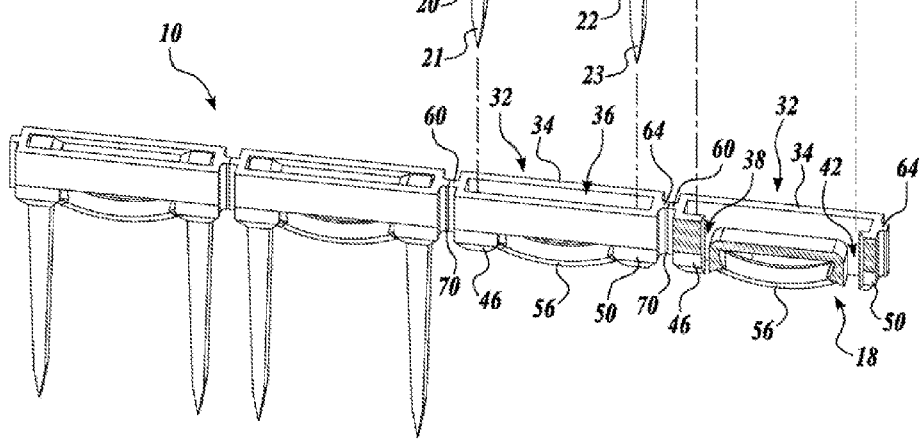
FIG. 6 is an isometric, partially exploded view of the collated stapler strip assembly of FIG. 3.

In the illustrated embodiment, the second leg 22 has a substantially square cross-sectional shape near the intersection of the second leg 22 and the bight 16, as shown in FIG. 5. As the second leg 22 extends toward the second foot 23, the second leg 22 decreases in width or changes in shape from a substantially square cross-sectional shape to a substantially rectangular cross-sectional shape. Above the second foot 23, the second leg 22 is substantially rectangular in cross-sectional shape, with the length of the rectangular cross-sectional shape defining an axis that is substantially perpendicular to the bight axis. To define the second foot 23, the cross-sectional size of the second leg 22 decreases at an increased rate and terminates in an edge having an axis that is substantially perpendicular to the bight axis.

As can be appreciated from the foregoing, the second leg 22 is effectively shaped like a chisel or similar device that can somewhat split the workpiece (such as wood) when being driven into the workpiece by the stapler. Thus, with each of the first and second legs 20 and 22 shaped like a chisel, a lower driving force may be imposed by the stapler S to drive the staple 14 into a workpiece than would be otherwise required with a stapler 14 of another design.

It should be appreciated that the staples 14 may instead be any other suitable design or configuration suitable for the intended application. For instance, the staples 14 shown and described may be preferred for use in most electrical applications. However, staples of other designs may be preferred in other applications. As an example, the bight 16 and/or the legs 20 and 22 may instead be generally circular in cross-sectional shape, as shown in the embodiments of FIGS. 7A, 7B, 8A, and 8B. Moreover, the bight 16 could instead be generally curved as it extends between the first and second legs 20 and 22 to correspond to the shape of a cable being secured to a workpiece by the staple 14. Thus, it should be appreciated that the collated stapler strip assembly 10 may be used with any suitable or desired staple configuration.

Referring still to FIGS. 3-6, an exemplary attachment strip 18 suitable for detachably securing a plurality of collated staples 14 together shoulder to shoulder will now be described in detail. In general, the attachment strip 18 comprises a plurality of attachment units 32 formed on or otherwise secured to each of the plurality of staples 14. The attachment units 32 detachably secure the plurality of staples 14 together shoulder to shoulder, or more specifically, with the bight axis of each staple substantially aligned or align-able. In that regard, adjacent attachment units 32 are detachably secured together at their ends and separable upon the application of a predetermined driving force imposed on the staple 14 by the drive head H. The attachment strip 18 is defined by a material that is at least somewhat deformable and/or elastic and non-conductive to electricity, such as plastic, rubber, fabric, tape, etc. In this manner, the collated staple strip assembly 10 can be pulled like a flexible strip of material through the magazine M to position each staple 14 beneath the drive head H in the staple ejection position.

In the illustrated embodiment, each attachment unit 32 is defined by a body portion 34 and first and second leg-enclosing portions 46 and 50. The body portion 34 is sized and shaped to tightly surround at least a portion of the bight 16, and the first and second leg-enclosing portions 46 and 50 are sized and shaped to tightly surround a portion of the first and second legs 20 and 22, respectively. Each body portion 34 has an interior cavity (not labeled) substantially the same size and shape as the bight 16 such that the body portion 34 surrounds the front, rear, side, and bottom surfaces of the bight 16. A top opening 36 in the body portion 34 is in communication with the interior cavity of the body portion 34, and the top opening 36 exposes the top surface of the bight 16. The body portion 34 may be any suitable overall shape and configuration, such as rectangular.

The top surface of the body portion 34 may be substantially flush with the top surface of the bight 16. As such, the drive head H of the stapler S will engage both the upper surface 17 of the bight 16 as well as the upper surface of the body portion 34 when imposing a driving force on the staple 14. It should be appreciated that the bight 16 may instead protrude upwardly from the top opening 36 such that the drive head H is engageable with only the bight 16.

First and second bottom openings 38 and 42 are defined in the bottom of the body portion 34 and are sized and configured to receive the first and second legs 20 and 22 therein. In other words, with the bight 16 received within the body portion 34, the first and second legs 20 and 22 protrude through the bottom openings 38 and 42. The first and second bottom openings 38 and 42 extend downwardly through the first and second leg-enclosing portions 46 and 50, which extend downwardly from a bottom surface of the body portion 34 to surround a portion of the first and second legs 20 and 22.

With the bight 16 received within the internal cavity of the body portion 34 and the first and second legs 20 and 22 received within the first and second bottom openings 38 and 42, each staple 14 is securely received within a corresponding attachment unit 32 of the attachment strip 18. As such, the collated staple strip assembly 10 may be pulled through the magazine M toward the drive head H without allowing the staples 14 to wobble or move excessively with respect to the attachment strip 18. Furthermore, the attachment unit 32 remains secured to the staple 14 when the attachment unit 32 is detached from the adjacent attachment unit 32 by the drive head H to drive the staple 14 into a workpiece.

An insulation piece 56 extends between the first and second leg-enclosing portions 46 and 50 such that it is engageable with an electrical wire, cable, or other material between the legs 20 and 22 when the staple 14 is driven into a workpiece. The insulation piece 56 may be generally curvilinear in shape with a concave surface of the insulation piece 56 directed toward the bottom surface of the body portion 34 and a convex surface of the insulation piece 56 directed away from the bottom surface of the body portion 34. Moreover, a gap is defined between the bottom surface of the body portion 34 and the insulation piece 56 such that the insulation piece 56 may deform upwardly toward the bight 16 of the staple 14 when engaging, for instance, an electrical wire or cable.

The insulation piece 56 is configured to protect and insulate an electrical cable or similar component positioned beneath the bight 16 (and between the legs 20 and 22) when the staple 14 is driven into a workpiece. For example, with the insulation piece 56 having a curvilinear shape as described above, the insulation piece 56 may deform upon impact to cushion the cable and at least partially absorb the driving force of the drive head H. With the insulation piece 56 deformed upwardly, the insulation piece 56 together with the first and second leg-enclosing portions 46 and 50 generally conform to the curved exterior surface of the cable to substantially surround the cable. As such, the non-metal insulation piece 56 and first and second leg-enclosing portions 46 and 50 insulate the cable and help prevent the cable from contacting the metal bight 16 and legs 20 and 22.

As noted above, adjacent attachment units 32 of the attachment strip 18 are detachably secured together at their ends to detachably secure the plurality of staples 14 together shoulder to shoulder. Moreover, the attachment units 32 are separable upon the application of a predetermined driving force imposed on the staple 14 by the drive head H to allow each individual staple 14 to be driven (along with the attachment unit 32) into a workpiece.

Although the adjacent attachment units 32 may be detachably secured together in any suitable manner, in the depicted embodiment, first and second attachment protrusions 60 and 64 extend from opposing exterior side surfaces of the body portion 34. A first attachment protrusion 60 of a first attachment unit 32 is secured to or otherwise formed integrally with a second attachment protrusion 64 of an adjacent attachment unit 32. A groove 70 is defined vertically between the first and second attachment protrusions 60 and 64 to define a weakened area of the attachment strip 18 between adjacent attachment units 32. Upon application of a predetermined driving force imposed on a staple 14 by the drive head H, the impacted staple 14 and its corresponding attachment unit 32 shears off from the adjacent staple 14 and attachment unit 32 at the groove 70.

As further noted above, the attachment strip 18 is made from an elastic and/or deformable material, such as plastic, so that it is configured to allow the collated staple strip assembly 10 to be flexibly pulled or moved through the magazine M toward the drive head H. In this regard, the first and second attachment protrusions 60 and 64 may bend about a substantially vertical axis defined by the groove 70 to allow the collated staple strip assembly 10 to move flexibly through the magazine M.

It should be appreciated that in certain applications, a horizontal groove may be formed in addition to or in the alternative to the vertical groove 70. In such applications, the attachment strip 18 could bend about a horizontal and/or a vertical axis when being moved through the magazine M toward the drive head H.

It should further be appreciated that various changes in shape, size, and configuration may be made to the attachment strip 18 and, more specifically, to the attachment units 32, without departing from the spirit and scope of the present disclosure. For instance, the attachment units 32 may instead be designed to enclose more or less of the staple 14, or may instead enclose no portion of the staple and be secured to a portion of the staple 14, such as with adhesive. As another example, the staple 14 may instead be formed from a deformable and/or elastic material, such as plastic, with the attachment units 32 of the attachment strip 18 integrally formed with the staple 14. In this alternative embodiment, the attachment unit may be merely comprised of first and second attachment protrusions 60 and 64 extending from the staple, as described above, to detachably and flexibly secure the staples together. Thus, it should be appreciated that the descriptions and illustrations herein are exemplary only, and should not be taken as limiting the scope of the claimed subject matter.

The collated staple strip assembly 10 may be formed in any suitable manner well known in the art. For instance, the staples 14 may be inserted into spaced slots in a mold into which molten material, such as plastic, is poured or injected. In this manner, the attachment units 32, formed around the plurality of staples 14, can be formed integrally as an attachment strip 18 to define the collated staple strip assembly 10. It should be appreciated that the collated staple strip assembly 10 may instead be formed in any other suitable manner.

Referring additionally to FIG. 2, the use of the collated staple strip assembly 10 with the stapler S will now be described. The collated staple strip assembly 10 is first loaded or fed into the stapler magazine M. If needed, a portion of the collated staple strip assembly 10 may be loaded into a storage portion of the magazine M, for instance, by rolling a portion of the collated staple strip assembly 10 into a coil within the storage portion. The collated staple strip assembly 10 may instead be pre-loaded or coiled within the storage portion by the manufacturer.

The end of the collated staple strip assembly 10 is then loaded into the elongated internal channel of the magazine M and pushed toward the drive head H. The strip is loaded into the channel with the legs of the staples 14 directed away from the drive head H when a first staple 14 is positioned beneath the drive head H in the ejection position. The collated staple strip assembly 10 may be loaded manually or through a loading mechanism (not shown) on the stapler S.

The collated staple strip assembly 10 is advanced within the elongated channel of the magazine M until the first staple 14 is positioned beneath the drive head H in the ejection position. The collated staple strip assembly 10 may be advanced within the magazine channel either manually or through the staple feeding assembly F. For instance, the spring of the staple feeding assembly F may frictionally engage the exterior surface of the body portions 34 of the attachment strip 18 to move the collated staple strip assembly 10 toward the drive head H into the ejection position. In the ejection position, the first staple 14 is positioned beneath the drive head H with the bight axis of the staple 14 positioned substantially parallel to or in alignment with the longitudinal or principal axis of the stapler S.

With the first staple 14 of collated staple strip assembly 10 in the ejection position, the stapler S is ready for use. The stapler S may be appropriately positioned on the workpiece, for instance, such that the legs 20 and 22 of the first staple 14 are positioned on either side of an electrical cable. The actuation assembly of the stapler S may then be activated through a trigger (not shown) or other device to move the drive arm D, and therefore the drive rod R and the drive head H, downwardly toward the first staple 14.

The bottom surface of the drive head H engages the bight 16 of the first staple 14 to impose a driving force onto the first staple 14. The driving force of the drive head H is a sufficient shearing force to detach the first staple 14 from the second or adjacent staple and to leave the remaining portion of the collated staple strip assembly 10 intact. In particular, the attachment strip 18 between the first and second staples separates at the groove 70 defined between the first and second attachment protrusions 60 and 64.

The legs 20 and 22 of the first staple 14 are driven downwardly into a workpiece until the bight 16 engages the electrical cable disposed between the legs 20 and 22. The insulation piece 56 deforms upwardly toward the bight 16 to cushion the impact of the bight 16 against the electrical cable. Moreover, with an electrical cable disposed between the legs 20 and 22 of the staple 14, the insulation piece 56 and the first and second leg-enclosing portions 46 and 50 of the attachment unit 32 collectively form an insulating barrier between the metal staple 14 and the electrical cable.

When the first staple 14 detaches from the second staple and the first staple 14 is driven downwardly into a workpiece, the remaining staples of the collated staple strip assembly 10 may again be advanced within the magazine channel through the staple feeding assembly F until the second staple is positioned beneath the drive head H in the ejection position. The stapler S can then drive the second staple, third staple, and each additional individual staple 14 of the collated staple strip assembly 10 in series into the workpiece.

Figure 7A:
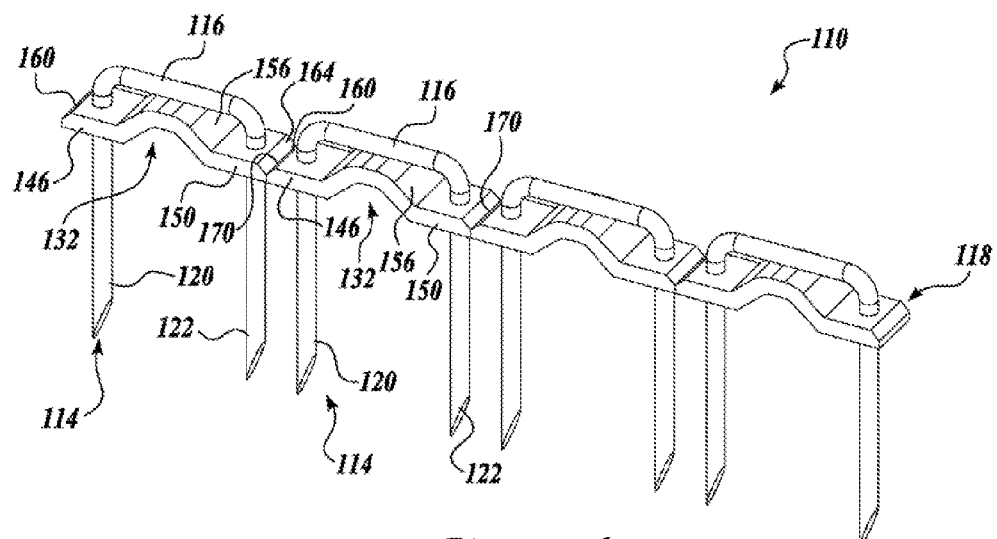
FIG. 7A is an isometric view of a collated stapler strip assembly formed in accordance with a first alternate embodiment of the present disclosure.
Figure 7B:
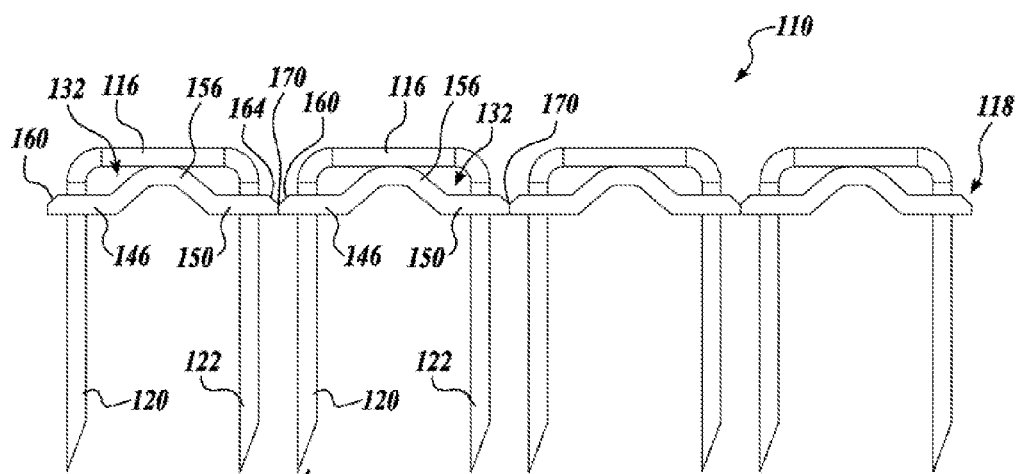
FIG. 7B is a front plan view of the collated stapler strip assembly of FIG. 7A.

Turning now to FIGS. 7A and 7B, a first alternative embodiment of a collated staple strip assembly 110 is depicted. The collated staple strip assembly 110 is substantially similar to the collated staple strip assembly 10 except for the differences hereinafter described. The collated staple strip assembly 110 is defined by a plurality of staples 114 detachably and flexibly secured to one another shoulder to shoulder with an attachment strip 118.

Each staple 114 is made from a suitable material, such as metal, and includes a bight 116 extending between first and second substantially parallel legs 120 and 122, similar to staple 14. However, in this first alternative embodiment of FIGS. 7A and 7B, the cross-sectional shape of the bight 116 and legs 120 and 122 of the staples 114 are generally circular in cross-section. Moreover, the corners defined between the bight 116 and the first and second legs 120 and 122 are generally curved. It should be appreciated that the staple 114 may instead be configured like the staple 14 described above or may instead be any other suitable design without departing from the scope of the present disclosure.

The attachment strip 118, which is made from a suitably deformable and/or elastic non-conductive material, detachably secures a plurality of collated staples 114 together shoulder to shoulder. The attachment strip 18 comprises a plurality of attachment units 132 formed on or otherwise secured to each of the plurality of staples 114. In the alternative, the staple 114 may instead be formed from a deformable and/or elastic material, such as plastic, with the attachment units 132 of the attachment strip 118 integrally formed with the staple 114.

The attachment units 132 may be generally rectangular in configuration, with the length and width substantially greater than the depth or thickness, and each attachment unit 132 extends lengthwise between the legs 120 and 122 of the staple 114 beneath the bight 116. The attachment units 132 include a first leg-enclosing portion 146 secured to and surrounding a portion of the first leg 120 and a second leg-enclosing portion 150 secured to and surrounding a portion of the second leg 122. An insulation piece 156 extends between the first and second leg-enclosing portions 146 and 150 beneath the bight 116. Similar to the insulation piece 56, the insulation piece 156 may be generally curvilinear in shape. However, the concave surface of the insulation piece 156 is directed away from the bottom surface of the bight 116 and the convex surface of the insulation piece 156 is directed toward the bottom surface of the bight 116.

The insulation piece 156 is configured to protect and insulate an electrical cable or similar component positioned beneath the bight 116 (and between the legs 120 and 122) when the staple 114 is driven into a workpiece. More specifically, the curvilinear shape of the insulation piece 156 substantially conforms to the curved exterior surface of the cable disposed between the legs 120 and 122. In this manner, the cable is substantially surrounded by the insulation piece 156 and the first and second leg-enclosing portions 146 and 150 to insulate the cable and help prevent the cable from contacting the metal bight 116 and legs 120 and 122.

As noted above, adjacent attachment units 132 of the attachment strip 118 are detachably secured together to detachably secure the plurality of staples 114 together shoulder to shoulder. The attachment units 132 are separable upon the application of a predetermined driving force imposed on the staple 114 by the drive head H to allow each individual staple 114 to be driven (along with the attachment unit 132) into a workpiece.

In the depicted embodiment, first and second attachment protrusions 160 and 164 are defined by the lateral ends of the first and second leg-enclosing portions 146 and 150. A first attachment protrusion 160 of a first attachment unit 132 is secured to or otherwise formed integrally with a second attachment protrusion 164 of an adjacent attachment unit 132. A groove 170 is defined horizontally between the first and second attachment protrusions 160 and 164 to define a weakened area of the attachment strip 118 between adjacent attachment units 132. Upon application of a predetermined driving force imposed on a staple 114 by the drive head H, the impacted staple 114 and its corresponding attachment unit 132 shears off from the adjacent staple 114 and attachment unit 132 at the groove 170.

As further noted above, the attachment strip 118 is made from an elastic and/or deformable non-conductive material, such as plastic. As such, the attachment strip 118 is configured to allow the collated staple strip assembly 110 to be flexibly pulled or moved through a magazine of a stapler toward the drive head. In this regard, the first and second attachment protrusions 160 and 164 may bend about a substantially horizontal axis defined by the groove 170 to allow the collated staple strip assembly 110 to move flexibly through the magazine. Thus, it can be appreciated that the collated staple strip assembly 110 may be used with a stapler having a magazine that extends either upwardly or downwardly from the stapler (as opposed to a magazine M that extends laterally or rearwardly from the drive head H, as shown in FIG. 2) so that the collated staple strip assembly 110 may bend about the horizontal axis of groove 170 to move flexibly through the magazine.

Figure 8A:
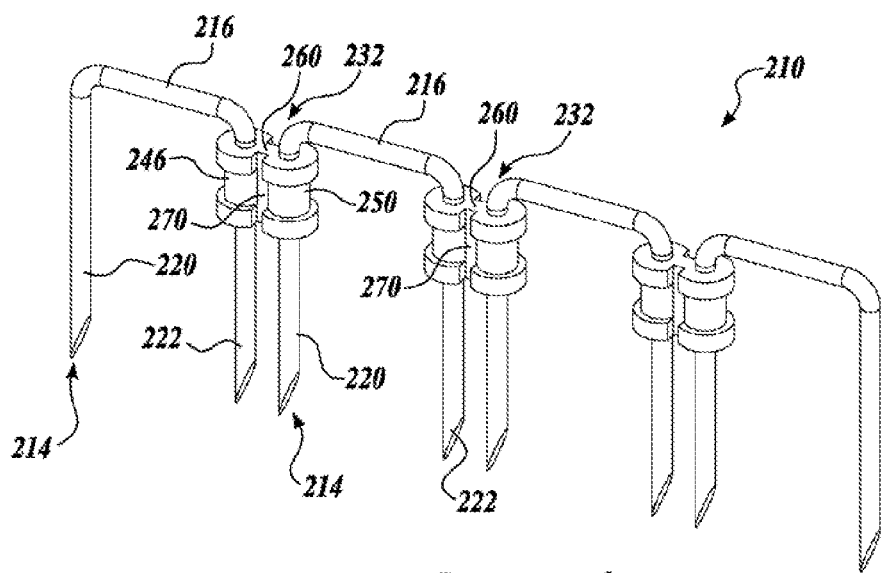
FIG. 8A is an isometric view of a collated stapler strip assembly formed in accordance with a second alternate embodiment of the present disclosure.
Figure 8B:
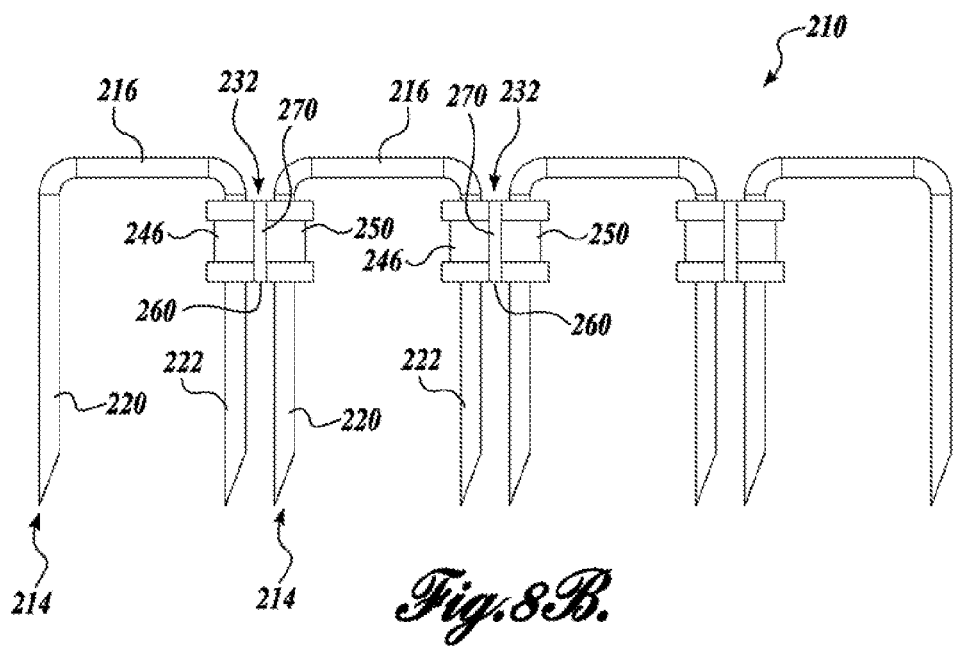
FIG. 8B is a front plan view of the collated stapler strip assembly of FIG. 8A.

Referring now to FIGS. 8A and 8B, a second alternative embodiment of a collated staple strip assembly 210 is depicted. The collated staple strip assembly 210 is substantially similar to the collated staple strip assembly 10 and the collated staple strip assembly 110 except for the differences hereinafter described. The collated staple strip assembly 210 is defined by a plurality of staples 214 detachably and flexibly secured to one another shoulder to shoulder with a plurality of attachment units 232. The staples 214 are substantially identical to the staples 114 depicted in FIGS. 7A and 7B; however, it should be appreciated that any suitable staple design, such as the design shown FIGS. 3-6, may instead be used.

The staples 214 are detachably secured to one another shoulder to shoulder through a plurality of attachment strips 232. Each attachment strip 232, which is made from a suitably deformable and/or elastic non-conductive material is formed on or otherwise secured to one of the first and second legs 220 and 222 of adjacent staples 214. In the alternative, the staple 214 may instead be formed from a deformable and/or elastic material, such as plastic, with the attachment strips 232 integrally formed with the staple 214.

The attachment strips 232 may be comprised of first and second attachment units 246 and 250 that are generally cylindrical in configuration. More specifically, the first attachment unit 246 is generally cylindrical and extends along a portion of the length of a second leg 222 of a staple 214 near the intersection of the second leg 222 and the bight 216. Similarly, the second attachment unit 250 is generally cylindrical and extends along a portion of the length of a first leg 220 of an adjacent staple 214 near the intersection of the first leg 220 and the bight 216.

The attachment strip 232 detachably secures the first and second legs 220 and 222 of adjacent staples 214 together shoulder to shoulder. In that regard, an attachment protrusion 260 extends between the first and second attachment units 246 and 250, and at least one channel or groove extends vertically along the attachment protrusion 260. A first groove 270 may extend along the front surface of the attachment protrusion 260, and a second groove (not labeled) may extend along the rear surface of the attachment protrusion 260.

The groove 270 defines a weakened area of the attachment strip 232 between adjacent staples 214. Upon application of a predetermined driving force imposed on a staple 214 by the drive head H, the impacted staple 214 and its corresponding first or second attachment unit 246 or 250 shears off from the adjacent first or second attachment unit 246 or 250 at the groove 270. In this manner, the attachment strips 232 are separable upon the application of a predetermined driving force imposed on the staple 214 by the drive head H to allow each individual staple 214 to be driven (along with the corresponding attachment unit 246 or 250) into a workpiece.

As noted above, the attachment strips 232 are made from an elastic and/or deformable material, such as plastic. As such, the attachment strips 232 are configured to allow the collated staple strip assembly 210 to be flexibly pulled or moved through a magazine of a stapler toward the drive head. In this regard, the attachment strips 232 may bend about a substantially vertical axis defined by the groove 270 to allow the collated staple strip assembly 210 to move flexibly through the magazine. Thus, it can be appreciated that the collated staple strip assembly 210 may be used with a stapler having a magazine similar to the magazine M described above.

Figure 9:
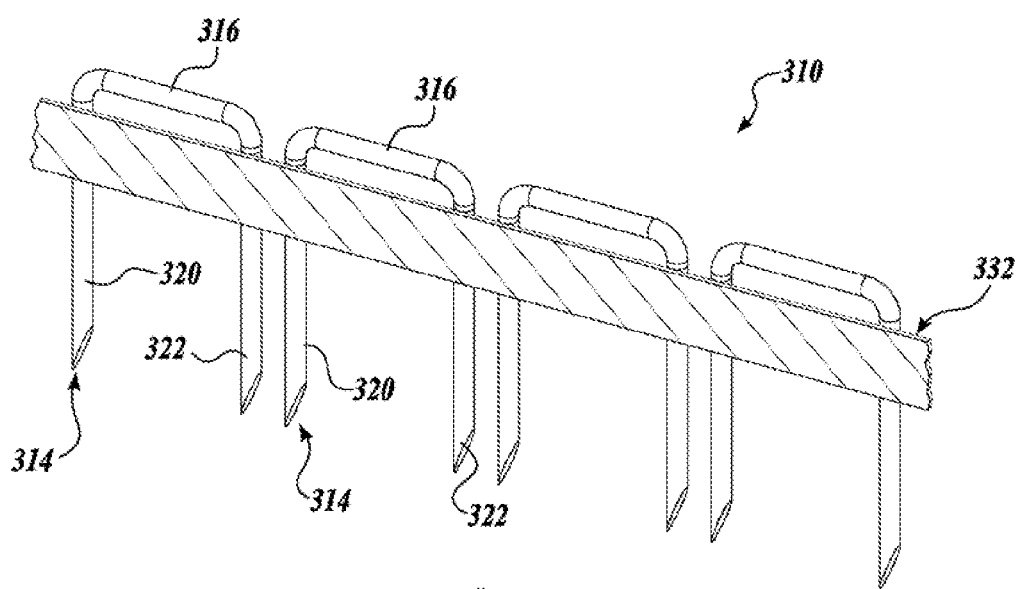
FIG. 9 is an isometric view of a collated stapler strip assembly formed in accordance with a third alternate embodiment of the present disclosure.

Referring now to FIG. 9, a third alternative embodiment of a collated staple strip assembly 310 is depicted. The collated staple strip assembly 310 is substantially similar to the collated staple strip assemblies 10, 110, and 210 except for the differences hereinafter described. The staples 314 are substantially identical to the staples 114 and 214 depicted in FIGS. 7A, 7B, 8A, and 8B; however, it should be appreciated that any suitable staple design, such as the design shown FIGS. 3-6, may instead be used.

The staples 314 are detachably and flexibly secured to one another shoulder to shoulder through plurality of attachment units defined by an attachment strip embodied as one or more elongated pieces of tape 332. The tape 332 is made from any suitably deformable and/or elastic non-conductive material, such as fiberglass tape or something similar.

In the illustrated embodiment, a piece of tape 332 is adhered to a portion of each staple 314 to secure the staples 314 together shoulder to shoulder. More specifically, the tape 332 extends across a front side of the legs 320 and 322 of the staples 314 such that the tape 332 is substantially transverse to the legs 320 and 322, and the tape 332 is substantially parallel to and spaced below the bight 316. In this configuration, a cog or gear of an advancement assembly of a stapler may engage a portion of the staple 314, such as one or both of the legs 320 and 322, to advance the collated staple strip assembly 310 toward the stapler drive head.

With the staples 314 secured together with a piece of tape 332, the collated staple strip assembly 310 may be flexibly pulled or moved through a magazine of a stapler toward the drive head. More specifically, with the tape 332 being deformable or bendable in any direction, as can be appreciated by one of ordinary skill in the art, the tape 332 may bend about both a substantially vertical and horizontal axis, or any axis therebetween, in the portion of the tape 332 between shoulders of adjacent staples 314. As such, the collated staple strip assembly 310 may move flexibly through any suitable magazine toward the drive head. It should be appreciated that a second piece of tape may be secured to a rear side of the legs 320 and 322 and the back side of the tape 332. In this manner, the collated staple strip assembly 310 may be coiled within a magazine or other storage mechanism without portions of the assembly adhering together.

When a staple 314 is positioned beneath the drive head, the drive head imposes a driving force on the staple 314 to drive the staple into a workpiece 314. Upon impact, the staple 314 may separate from the tape 332, with the detached tape being wound into a waste receptacle, for instance. In the alternative, the tape 332 may be cut or sheared off in the portion of the tape 332 or in the gap between the shoulders of the first and second staples 314. In this manner, the portion of the tape 332 secured to the staple 314 would travel with the staple 314 into the workpiece.

While illustrative embodiments of a collated staple strip assembly have been illustrated and described, it will be appreciated that various changes can be made therein without departing from the spirit and scope of the present disclosure. For instance, the attachment strip and/or the attachment units may instead be embodied as one or more pieces of wire, string, welded joints, or other suitable materials. Thus, it should be appreciated that the foregoing descriptions and illustrations herein are exemplary only, and should not be construed as limiting the scope of the claimed subject matter.

The embodiments of the present disclosure in which an exclusive property or privilege is claimed are defined as follows:

1. A collated staple strip assembly for use with a stapler having a drive head, the stapler having a principal axis extending along the length of the stapler, the collated staple strip assembly comprising:
   (a) first and second staples, each staple having a bight extending between first and second legs with each bight defining a bight axis and with each of the first and second legs defining first and second leg axes, each staple having a height extending along one of the first and second leg axes from a bottom of one of the first and second legs to a top of the bight; and
   (b) an attachment strip having a first portion with an interior cavity that is configured to receive and at least partially enclose the bight of the first staple and having a second portion with an interior cavity that is configured to receive and at least partially enclose the bight of the second staple, and wherein the first and second portions are connected together such that the attachment strip is deformable about a first axis extending along at least a portion of the height of one of the first and second staples and substantially parallel to one of the first and second leg axes of one of the first and second staples to position the first and second staples such that the bight axis of the first staple is substantially alignable with the bight axis of the second staple so that each of the first and second staples may be moved into an ejection position beneath the drive head and driven into a workpiece with the bight axis positioned in substantial alignment with the principal axis of the stapler.

2. The collated staple strip assembly of claim 1, wherein the attachment strip defines an attachment strip axis extending along a length of the attachment strip, wherein the attachment strip axis is substantially parallel to the bight axis of the first and second staples.

3. The collated staple strip assembly of claim 1, wherein the attachment strip is made from a non-conductive material.

\* \* \* \* \*